Sept. 11, 1956   R. V. EDDS   2,762,150
APPARATUS AND PROCESS FOR REMOVING MATERIAL FROM A WORK PIECE
Filed May 2, 1955                                     2 Sheets-Sheet 1
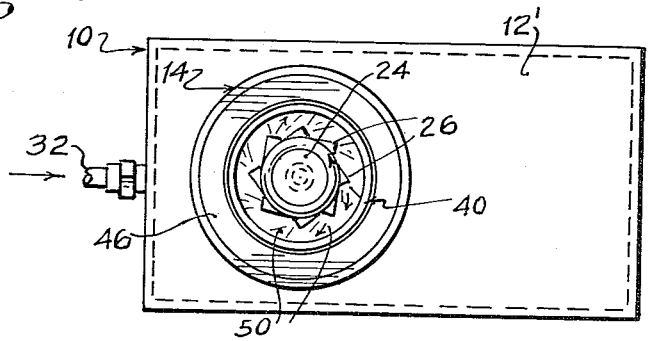
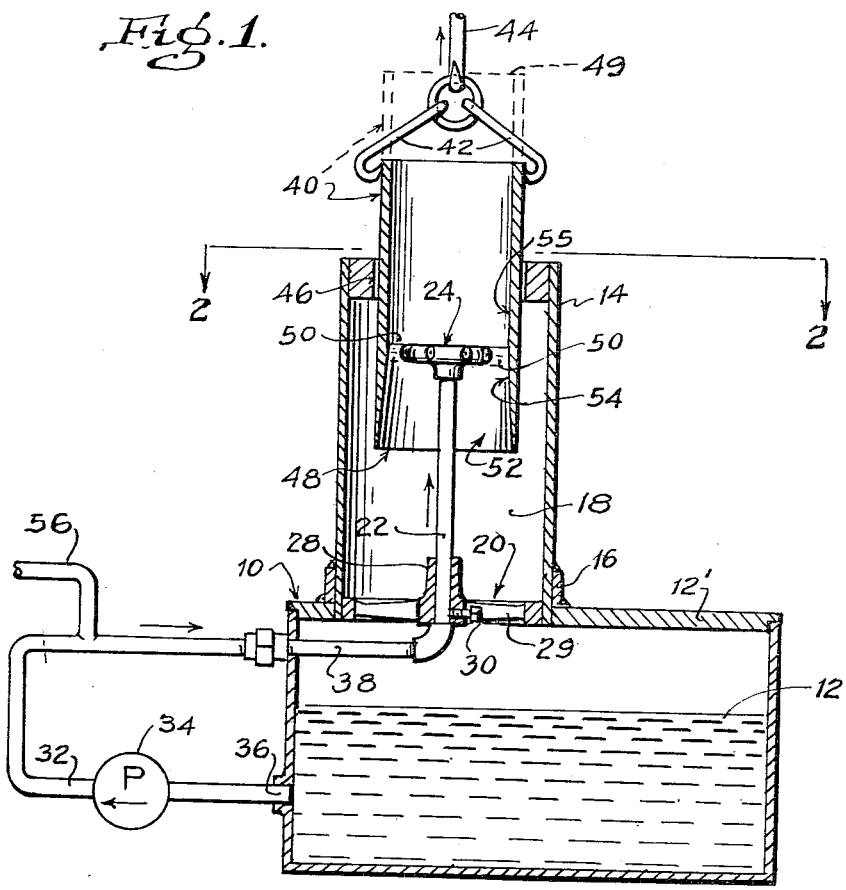
INVENTOR
RICHARD V. EDDS
BY Philip Subkow
ATTORNEY.

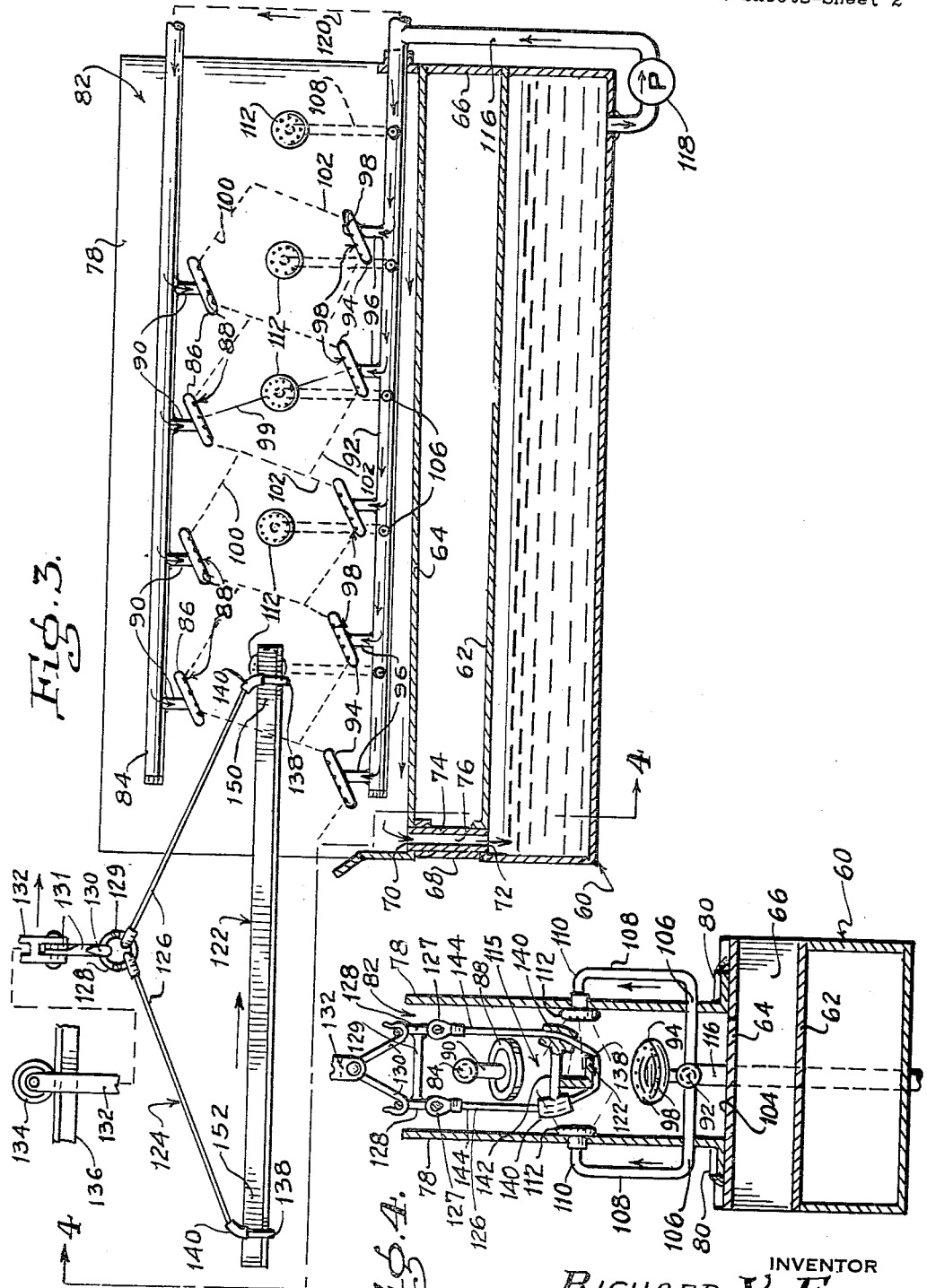

United States Patent Office 2,762,150
Patented Sept. 11, 1956

2,762,150

APPARATUS AND PROCESS FOR REMOVING MATERIAL FROM A WORK PIECE

Richard V. Edds, Los Angeles, Calif., assignor to Turco Products, Inc., Los Angeles, Calif., a corporation of California Application May 2, 1955, Serial No. 505,121

14 Claims. (Cl. 41—9)

This invention relates to removal of material from a work piece, e. g., composed of a metal, by a chemical etching solution. More particularly, the invention is directed to a novel procedure for producing tapered surfaces where the tapering is either on an external or an internal surface of the work piece, e. g., production of a tapered hole in hollow objects, such as in tubing.

Cutting and machining various types of holes in objects, e. g., of metal, is of course well known. In some cases, the side walls of tubing and other similar simple and symmetrical objects may be tapered by mechanical means if the taper is simple in nature. However, as far as is known to me, it has heretofore not proved practically feasible to produce tapers on either the external or internal surface of complicated parts where the surface is not a plane surface or a surface of revolution.

Thus, in the case of a piece of curved tubing or tubing bent into a complicated shape prior to tapering, production of an external or an internal taper could not, to my knowledge, be accomplished commercially by present machining techniques. Also, production of a tapered hole in a metal billet having a hole with a non-symmetrical cross-section, i. e., other than a surface of revolution, would be most difficult by machining, especially where the hole does not extend through the part and has a curve or series of bends therein. Sometimes the side walls of tubing are not uniform in thickness as the hole is not centered in the tubing. The tapering of such a hole from one end to the other of a piece of tubing would be very difficult with present machining techniques as it would be difficult to center the internal hole, and such machining would be out of the question if the tubing were curved, except by specially designed single purpose tools.

One object of this invention is the removal of material from an external or internal surface of an object.

Another object is the provision of procedure for tapering an external or internal surface of a part.

Yet another object is to provide a procedure for tapering the internal surface of a hole or aperture in an object.

A still further object is to afford novel and relatively inexpensive procedure for tapering the external surface or the side walls of a hole in a metal part by chemical etching.

Yet another aim of the invention is the provision of a method for tapering an irregular external surface and/or the side walls of a hole of irregular shape in parts of various types, such as tubes, billets, and the like.

Still another object is to provide novel and efficient apparatus for carrying out the invention procedure.

Other objects and advantages will appear hereinafter.

I have found that the external surface of an object, or the internal surface of a hole or aperture therein, can be tapered as desired by a unique chemical etching or milling procedure so that regardless of the shape of the part or of the hole in the part, the external or internal side walls of the part can be uniformly tapered along the length thereof. While a taper can be formed on the external surface of a part by immersing such part in an etching solution or withdrawing the part from such solution, at a controlled uniform rate, such procedure is not suitable for production of a taper on an internal surface of a part, e. g., the walls of a bore therein. This is due to the fact that maximum control of taper angle cannot be readily achieved by this technique since the gas, usually generated in the etching reaction, rushes through the internal portion of the part with such violence as to carry etching liquid up through the part at a relatively high velocity. This is particularly true where the bore is relatively small in cross-sectional area, so that the disengaging surface at the level of the liquid in the bore is small. This causes erosion along the upper portion of the internal surface so that the degree of taper is greatly minimized, an in effect producing an etched internal surface which is almost evenly etched along the length thereof.

Present chemical etching procedures are also inadequate for internally or externally tapering very long or large awkward pieces. Thus, for example, the immersion method is considered impractical for the tapering of very long parts, such as 60 to 80 foot extrusions used in aircraft wing sections.

I have found that I can produce a taper of the amount desired on the external or internal surface of a part, particularly a metal part, by a technique which comprises impinging a stream of chemical etching solution for varying periods of time against only those portions of the surface of the part which it is desired to etch, and permitting the thus impinging etching solution to drain only from those portions of the surface which are subjected to etching, and particularly from those surface portions which are to be subjected to etching for longer periods than other surface portions.

The invention involves impinging a stream of chemical etching solution against a portion of the surface of the part to be etched and moving such surface with respect to the stream of etchant so as to change the localized area of impingement of the stream against said surface and to expose successively greater surface portions to contact with the solution by direct impingement against and drainage of said solution from said surface. Thus, the etching solution is caused to contact successively greater areas of the surface to be etched to form the desired etch configuration or taper, without contacting those portions of the surface which it is not desired to etch.

According to one embodiment for tapering the internal surface or the wall of an aperture in a part, the invention can be carried out by inserting into said aperture a nozzle designed to discharge a plurality of liquid etchant streams laterally outward against said internal walls. The assembly is positioned over a tank, as will be pointed out in detail hereinafter, and the part is then moved relative to the nozzle. Thus, by moving the part downwardly with respect to the nozzle, successively higher and greater portions of the internal surface to be etched are brought into contact with the etching solution due to direct impingement of the solution and downward drainage thereof from the internal surface of the part, to thereby vary the period of etching of said successive internal surface portions by the solution. In this manner the lower internal surface portions of the part are etched for a greater period than successively higher internal surface portions thereof.

This results in the formation of an efficient taper of the degree desired on the internal surface of, or along a bore or hole in, the part, with the gases generated in the etching reaction passing through the bore. That portion of the wall of the bore above the area of impingement of the etching solution emitted from the nozzle or nozzles remains unattached by the solution.

In another embodiment of the invention, a taper can be applied to the external surface of a part, e. g., a part of irregular shape, by passing the part either vertically or laterally through preferably a plurality of spray streams discharged by a plurality of nozzles disposed adjacent or just outside the path of movement of the part. The nozzles are so positioned that as the part proceeds through the banks of sprays, successively greater external surface portions of the part are exposed to the streams of etchant being discharged from the nozzles, thereby varying the period of etching of such successive surface portions and forming a taper, the large portion of which is at that location which was first exposed to the etchant streams, and which continued to be exposed to successive etchant streams during movement of the part past the successive spray nozzles. The spent etchant liquid, following impingement thereof against the surface of the part, drains back into a tank provided below the nozzles.

The invention will be more readily understood by reference to the description below of certain preferred embodiments, taken in connection with the accompanying drawings, wherein:

Fig. 1 is a sectional view in elevation of novel apparatus for carrying out the invention procedure according to one embodiment;

Fig. 2 is a horizontal section taken on line 2—2 of Fig. 1;

Fig. 3 is a sectional view in elevation of novel apparatus for carrying out the invention procedure according to another embodiment; and Fig. 4 is an end view, mostly in section, taken on line 4—4 of Fig. 3.

Referring to Fig. 1 of the drawings, numeral 10 represents a tank containing a body of etching solution 12 which may be either of the acid or alkaline type depending on the particular metal or material being etched. Where aluminum or its alloys are to be etched, the etching treatment is carried out in an aqueous solution containing an alkali such as sodium or potassium hydroxide, trisodium phosphate, sodium carbonate or the like, or mixtures thereof. Concentration of the alkali etching solution can be in the range of 0.1 to 10 normal. Temperature of the solution may range say from room temperature, for example, 60° to 70° F., to about 212° F. Generally, a hot solution is employed, with temperature maintained in a range from about 140° F. to about 210° F. during treatment.

Mounted over the tank 10 and secured to a cover member 12' thereof is a cylindrical shield 14, the lower end of which is secured to cover 12' by suitable means, such as soldering, a ring 16 being disposed about the lower end of shield 14 to help support same over the tank. The internal space 18 within the shield is in communication with the tank through an aperture 20 in the tank cover 12'.

Supported axially within shield 14 is a pipe 22, on the upper end of which is mounted a nozzle wheel 23 which is rotatable with respect to the pipe. Nozzle wheel 24 has positioned about the periphery thereof a number of equally spaced nozzles 26 tangentially disposed with respect to the periphery of the wheel 24 and designed to discharge liquid essentially in a lateral direction. On discharge of a stream of liquid through the nozzles in a lateral direction, the wheel 24 is caused to rotate in a well known manner from the reaction resulting from emission of the liquid streams.

Pipe 22 is mounted at its lower end in a sleeve 28 connected to the top of tank 10 by means of the lateral arms 29, and is held in fixed position in said sleeve by means of a set screw 30. Etching solution in tank 10 is fed into the lower end of pipe 22 by pumping the solution through a line 32 having a pump 34 therein, the lower end of the line having an inlet 36 from the tank, and the other end of the line 38 being connected to the lower end of pipe 22.

A metal tube 40 which is to be tapered internally is gripped at one end by a hook 42 on a support 44, said support being connected to means (not shown) for upward or downward movement of tube 40 at a preselected rate. Such means may be of the type disclosed and claimed in U. S. application, Serial No. 464,301 of William P. Langsfeld, filed October 25, 1954. The tube 40 is held suspended within a ring-shaped guide member 46 connected to the upper end of the shield 14, and is moved downwardly within the shield 14 along the central axis thereof, until the lower end 48 of the tube is in line horizontally or laterally with the spray nozzles 26. The position of the tube 40 at this time is indicated by the dotted lines 49.

Liquid etchant is then pumped through line 32 into pipe 22 and the nozzle wheel 24, and the liquid is discharged laterally from the nozzles 26 in streams 50, which impinge against the inner surface at the lower end of the bore 52 of tube 40 to etch said surface. The tube 40 is then moved downwardly over the nozzle wheel 24 and the pipe 22 at a preselected substantially uniform rate. At the part is moved downwardly, successively higher and greater portions of the internal surface of the bore 52 of the tube become exposed to the etching solution, and after striking said higher surface portions in the areas directly opposite the nozzles, the etching liquid flows down the internal surface of the bore, causing the portion of the internal surface below the spraying level to continue being etched. The etchant solution then returns to tank 10 for reheating.

This produces in tube 40 a uniform internal taper 54 having smooth sides as a result of the rotation of the nozzle wheel 24 during the etching period and the discharge through nozzles 26 of a uniform quantity of liquid circumferentially about the internal surface of the tube adjacent the nozzles. Since the lower end of the tapered internal surface of the tube is exposed to etching solution for a longer period than the upper tapered portion of such internal surface, the taper formed is reversed, with the larger internal diameter at the lower end of the tapered surface. The upper portion 55 of the internal surface of the tube bore 52, which portion is located above the nozzles 26 and is not subjected to the action of the etching solution discharged from the nozzles during the etching period, remains unaffected and hence retains its vertically extending untapered walls. During the etching period, the shield 14 protects the operator from stray droplets of etching solution.

By varying the speed of movement of tube 40, a non-uniform taper can be obtained. The nature of the taper formed can be controlled by the rate of movement of the part, knowing the concentration and temperature of the solution being discharged against the part. Following formation of the desired taper, the flow of etching solution through nozzles 26 is interrupted and rinse water is then conducted from line 56 through line 32 and pipe 22 to the nozzles 26, and is discharged against the tapered surface 54 for rinsing same free of etching solution. The part 40 is then withdrawn upwardly out of shield 14 and removed from the hook 42.

Instead of moving tube 40 downwardly over the spray nozzle wheel 24 to produce the taper 54, the tube 40 can be moved downwardly over the nozzle wheel 24 to the full line position shown in Fig. 1 prior to commencement of etching. Liquid etchant is then pumped through nozzles 26 against the internal surface of the bore 52 as the part 40 is moved upwardly at a uniform rate, the solution flowing down the sides of the bore to the tank during this period. When the end 48 of the part is lifted to a position which is level with the nozzles 26, i. e., to the dotted line position 49, the flow of etching solution is discontinued and the internal tapered portion is rinsed with water, as described above, followed by removal of the part from within the shield 14.

Referring now to Figs. 3 and 4, a tank 60 of generally retangular shape is provided having a cover 62 thereon, and a platform 64 mounted above the tank on vertical supports or walls 66 and 68 integral with or connected by suitable means to the top edges of the tank. The platform 64 has a slight incline extending downwardly from support 66 to support 68 for drainage of spent liquid etchant, as described hereinafter, along such platform toward support 68. An aperture 70 is provided in platform 64 adjacent support 68, and a second aperture 72 is positioned in cover 62 directly below aperture 70, to permit drainage of liquid etchant from platform 64 back into the tank 60. A vertical baffle 74 is positioned adjacent apertures 70 and 72, and in spaced parallel relation to support 68, to provide a conduit 76 in communication with apertures 70 and 72 to facilitate such drainage.

A pair of spaced-apart vertical plates 78 substantially co-extensive with the length of the tank 10, and each having a horizontal web 80 extending outwardly from their lower ends, are mounted on platform 64 with the webs 80 connected as by welding to the platform. The space between plates 78 forms an etchant spray chamber 82 through which the work is conducted in the hereinafter described manner to etch the outer surface of the work piece so as to impart a taper to such surface. Disposed at intervals along an upper pipe 84 which is mounted horizontally along the upper central portion of chamber 82 and extends parallel to the side walls 78 thereof, is a series of spray heads or nozzles 86 having a plurality of holes 88 therein for discharge of etchant liquid therefrom. The spray heads communicate with and are suspended from pipe 84 via headers 90, and the spray heads 86 are inclined at an angle to facilitate uniform etching of the work by the spray streams emitted therefrom, as will be understood more clearly hereinafter.

A pipe 92 is mounted horizontally along the lower central portion of chamber 82 directly below and parallel to the upper pipe 84. Positioned at intervals along pipe 92 is a second series of spray heads or nozzles 94, each of said nozzles being displaced horizontally from the adjacent upper spray heads 86, as seen in Fig. 3. Spray heads 94 are connected to and communicate with pipe 92 by means of headers 96, the spray heads having apertures 98 therein for emission of spray streams. It is noted that spray heads 94 are inclined at the same angle as the upper spray heads 86, and that the opposite pairs of spray heads 86 and 94 are in substantial alignment with each other along a sloping line indicated at 99 and extending substantially along the axis of each of such pairs of spray heads, so that the spray streams 100 and 102 emitted from opposite pairs of spray heads 86 and 94, respectively, impinge against each other approximately midway between said spray heads. This positioning of the spray heads or nozzles provides efficient contact of the etching solution with the work, which is conducted through chamber 82, affording a substantially continuous envelope of spray for the work piece from one end to the other of said chamber, and facilitates drainage of the spent liquid from the work to the bottom 104 of the chamber formed by the longitudinally extending central portion of platform 64, from which the liquid drains back into tank 60 via conduit 76.

Also connected to the lower pipe at intervals therealong are pairs of lateral pipes 106 extending outwardly in opposite directions from pipe 92. These pipes 106 are each bent upwardly at 108 and then horizontally inward at their upper ends, forming portions 110, to the extremities of which are connected oppositely facing nozzles 112 having apertures 114 therein, said nozzles being positioned along the inner surfaces of plates 78 within chamber 82. Opposing pairs of nozzles 112 are in horizontal alignment with each other, and such nozzles are positioned on pipes 106 so that each pair of opposing nozzles 112 is disposed approximately midway between the adjacent pair of spray heads 86 and 94, and in alignment with the spray streams discharged therefrom, as seen in Fig. 3.

It is accordingly seen that the system of spray nozzles above described and illustrated in Figs. 3 and 4 is so designed that when a part is passed through the area 115 between each bank of nozzles 86, 94 and 112, as observed in Fig. 4, the part will receive a uniform spray of etchant solution on all external surfaces thereof within such area. This spray nozzle system thus provides a highly efficient means for impinging streams of echant liquid against a part conducted horizontally through the chamber 82 and between the nozzles, particularly for imparting a taper to the outer surface of the part.

Liquid echant is pumped from tank 60 to pipe 92 via pipe 116, the latter having a pump 118 connected to the pipe for this purpose. The etching solution is also conducted to the upper pipe 84 by means of a pipe represented by dotted line 120, and communicating with pipes 92 and 84.

An angle member 122 whose outer surface is to be tapered is supported near its opposite ends in a sling 124 for passage through the spray chamber 82 and into the area between the above described system of nozzles. The sling comprises a pair of cables 126, each connected at their opposite ends by means of eyes 127 to rings 128, the two rings being held in spaced opposite relation to each other by a rod 129 connecting said rings. The rings are suspended from hooks 130 which in turn are connected at their upper ends 131 to an arm 132. The arm 132 has rollers 134 mounted at the upper end thereof, said rollers resting on longitudinally extending tracks 136 suitably mounted above the tank 60 and in vertical alignment with the central longitudinal axis of the spray chamber 82. The cables 126 are each looped at their central portions 138, and the cables adjacent said loops are received within a pair of opposite flexible sleeves 140 connected by a cross brace 142 to support said loops. Rod 129 and brace 142 are of substantially the same length so that the opposite end portions 144 of each cable are parallel, as seen in Fig. 4.

The angle member 122 to be tapered by etching is received near its opposite ends in the two opposite central loops 138 of the cables 126. It is noted in Fig. 4 that rod 129 and cross braces 142 maintain the end portions 144 of the cables separated at sufficient distance to enable those portions of the sling bounded by rod 129, cross braces 142, and the cable end portions 144 to clear the upper spray heads 86 as the sling and work piece 122 are conducted through the spray chamber 82, the spray heads 86 passing between the cable portions 144. Further, the sling 124 supports the work piece 122 at the level of the side spray nozzles 112 for passage of the work piece through the spray chamber 82 directly opopsite the lateral nozzles 112 and about midway between the opposing pairs of upper and lower nozzles or spray heads 86 and 94.

For etching the part 122 according to the invention procedure, etchant solution is pumped from tank 60 to the nozzles 86, 94 and 112, and the angle member 122 supported by sling 124 is conducted by means of the overhead track and roller system above described into one end of spray chamber 82 and into the central portion of the area between the adjacent nozzles, forming the respective banks of nozzles, as seen in Figs. 3 and 4. The sling 124 and the part 122 carried thereon are caused to move at a substantially uniform rate into the spray chamber. It is seen in Fig. 3, that the forward end 150 of part 122 is the first portion thereof to be subjected to the action of the spray streams discharged from those nozzles at the left end of the spray chamber, and as the part continues to move into said chamber from left to right, as viewed in Fig. 3, successively greater portions of the external surface of angle 122 are exposed to contact by the spray streams emitted from the nozzles.

During continued movement of the part into the spray chamber, the etchant solution from an increasingly greater number of the nozzles impinges against those portions of the part disposed within the chamber, and since the forward end 150 of part 122 is subjected to the action of the echant sprays for a longer time interval than any of the other portions of the part during passage thereof into the chamber, when the end 150 is at the right end of the chamber, as viewed in Fig. 3, this end of the part 122 will have been etched deeper than any of the other portions of the external surface of part 122. Also, the rear portion 152 of part 122 will have been etched the least when the part has passed entirely into the chamber 82, because such portion will only have been subjected to the action of the etchant sprays from the nozzles at the left for a relatively short interval. Intermediate portions of part 122 will be etched to a depth which diminishes uniformly from the right to the left between the end portions 150 and 152 of the angle member 122. Hence, when the part 122 is entirely within chamber 82, the external surface of the part will have a uniform taper from the left to the right end thereof. Following impingement of the etchant solution against the part, the spent solution flows back into the tank 60 via conduit 76, for reheating and recirculation to the nozzles.

On passage of the part 122 completely into chamber 82, and following etching to produce the desired taper, pumping of the etching solution to the nozzles is discontinued, and the part is conducted out of spray chamber 82 into a zone or second chamber (not shown) where the part is rinsed free of etching solution.

If desired, means may be included for rotating the part during its passage into the etchant spray chamber 82 to insure uniformity of etching and proper drainage of solution from the part. This rotation technique may be preferably applied where the external shape of the part to be tapered is of a complex nature.

Replenishment of the etchant in the etching bath is required from time to time, especially in the case of the process illustrated in Fig. 1, wherein rinse water drains back into the tank, causing dilution of the etching solution therein.

While the above procedures may be carried out by mechanical means for suspending and moving the parts to be etched, this can also be accomplished by manual manipulation of the parts, if the parts are sufficiently small to be manageable by workmen, as will be understood by those skilled in the art. Means may also be provided for automatically moving the parts to give a predetermined internal or external configuration which may be of a uniform taper, as when the parts are moved at a uniform rate, or to produce any other desired geometry of the internal or external surface, by moving the parts at a time cycle other than uniform progression. Such machinery is disclosed and claimed in the co-pending application of William P. Langsfeld, Serial No. 470,245, filed November 22, 1954.

The articles of manufacture of my invention produced by the processes of my invention include those whose external surfaces are irregular so that the cross-sectional areas of the part vary along the length thereof. Also included are articles whose apertures have their cross-sectional geometry varied along the length of the aperture.

From all of the foregoing it is seen that I have provided a unique, inexpensive, and rapid method of producing internal or external tapers on variously shaped parts.

While I have described particular embodiments of my invention for the purpose of illustration, it should be understood that various modifications and adaptations thereof may be made within the spirit of the invention, as set forth in the appended claims.

I claim:

1. A method of removing material from the surface of a work piece which comprises impinging a stream of chemical etching solution against a portion of said surface, moving said surface with respect to said stream to expose successive surface portions to the area of impingement, and simultaneously additionally contacting with chemical etching solution a varying surface area of said work piece adjacent to said area of impingement, the time periods of contact for different sections of said varying surface area being different, thereby to vary the period of etching over said surface.

2. A method of removing material from the surface of a work piece by chemical etching, which comprises spraying a stream of chemical etching solution against a localized area of said surface, moving said work piece and said surface with respect to said sprayed stream in a direction to change the position of the localized area of impingement of said stream against said surface, and additionally draining solution from said stream over said work piece in a direction opposite to the direction of movement of said work piece, thereby to vary the period of etching over said surface.

3. A method of removing material from the surface of a work piece by chemical etching, which comprises spraying at least one of a plurality of streams of chemical etching solution against a localized area of said surface, draining said solution from said surface, moving said work piece with respect to said streams in a direction to change the position of the area of impingement of said one stream, and additionally simultaneously varying the number of said streams impinging upon said work piece and the area of said work piece, adjacent said area of impingement of said one stream, impinged by said streams, the time period of impingement for different sections of said varying surface area being different, thereby to vary the period of etching over said surface.

4. A method as defined in claim 3, wherein said movement of said work piece is in a direction to increase the number of streams impinging upon said work piece and to increase the area of said work piece, adjacent said area of impingement of said one stream, impinged by said streams.

5. A method of removing material from the surface of a work piece by chemical etching, which comprises spraying a stream of chemical etching solution against a localized area of said surface, moving said work piece and said surface with respect to said sprayed stream in a direction to change the position of the localized area of impingement of said stream against said surface, and additionally draining solution from said stream over said work piece in the same direction as the direction of movement of said work piece, thereby to vary the period of etching over said surface.

6. A method of removing material from an internal surface of an aperture in a work piece by chemical etching, which comprises spraying a plurality of streams of chemical etching solution against a localized portion of said internal surface, and moving said internal surface with respect to said streams in a direction to expose successive localized portions of said internal surface to impingement by said solution, and additionally draining solution from said streams over an area of said surface adjacent the area of impingement, thereby to vary the period of etching over said surface.

7. A method as defined in claim 3, wherein said movement of said work piece is in a direction to decrease the number of streams impinging upon said work piece and to decrease the area of said work piece, adjacent said area of impingement of said one stream, impinged by said streams.

8. A method of tapering the internal surface of a tubular work piece by chemical etching, which comprises spraying a plurality of streams of said solution against a localized area of said internal surface, additionally draining the solution from said streams over said surface below the localized area of impingement of said streams against said surface, moving said work piece and said internal surface downwardly with respect to said sprayed stream in a direction to change the position of said localized area of impingement and to increase the area of said surface over which said solution is drained, thereby to vary the period of etching over said surface.

9. A method of tapering the internal surface of a tubular work piece by chemical etching, which comprises placing said tubular work piece over a rotatable nozzle positioned within the bore of said tubular work piece, spraying a plurality of streams of etching solution from said nozzle against a localized area of the wall of said bore, rotating said nozzle during emission therefrom of said streams, draining said solution over a portion of said wall adjacent the localized area of impingement of said streams against said wall, moving said tubular work piece in a direction along the axis of said work piece to change the position of said localized area of impingement and to vary the area of said portion of said wall adjacent said area of impingement, thereby to vary the period of etching over said wall.

10. A method of tapering the external surface of a work piece by chemical etching, which comprises passing a work piece laterally into a spraying zone, conducting said work piece through a first area in said zone, discharging a plurality of streams of etching solution from a first series of nozzles disposed about said area against a localized portion of said surface, the position on said work piece of the localized area of impingement of said streams changing as the work piece is conducted through said area, and simultaneously discharging an additional number of streams of etching solution from an additional number of nozzles upon the external surface of a section of said work piece adjacent said localized area of impingement, the periods of impingement of solution upon different regions of said section being different, the extent of said section exposed to said additional streams varying in accordance with the changing position of said localized area of impingement, thereby to vary the period of etching over said surface.

11. Apparatus for etching a work piece, which comprises a tank having a cover thereon, said tank being adapted to contain an etching solution, a shield having an enclosed side wall and forming a chamber therein, said shield being mounted on the cover of said tank, said cover being apertured at the base of said shield to provide communication between the interior of said shield and said tank, a first pipe mounted within said shield and extending upwardly therein, a nozzle connected to the top of said pipe, said nozzle being adapted to discharge a stream of etching liquid in a lateral direction, a second pipe connecting the interior of said tank with the base of said first pipe, pump means for pumping etching liquid from said tank through said second pipe to said first pipe and said nozzle, and a guide member mounted near the upper end of said shield for guiding movement of a work piece into said shield and adjacent said nozzle.

12. Apparatus for etching a work piece, which comprises a tank having a cover thereon, said tank being adapted to contain an etching solution, a shield having an enclosed side wall and forming a chamber therein, said shield being mounted on the cover of said tank, said cover being apertured at the base of said shield to provide communication between the interior of said shield and said tank, a first pipe mounted within said shield and extending upwardly along the axis therein, a nozzle wheel mounted for rotation at the upper end of said pipe, a plurality of tangential nozzles disposed about the periphery of said wheel and adapted to discharge streams of etching liquid in a lateral direction perpendicular to said axis, a second pipe connecting the interior of said tank with the base of said first pipe, pump means for pumping etching liquid from said tank through said second pipe to said first pipe and said nozzles, and an annular guide member connected near the top of said shield and having an aperture therein for guiding movement of a tubular work piece into said shield and over said nozzle wheel.

13. Apparatus for etching a work piece, which comprises a tank, said tank being adapted to contain an etching solution, a housing mounted over said tank and constituting an etching chamber, a first pipe mounted longitudinally along the upper portion of said chamber, a first series of spray nozzles connected at intervals along said pipe, said spray nozzles being inclined at substantially the same angle to discharge liquid streams downwardly at an angle to the vertical axis of said chamber, a second pipe mounted longitudinally along the lower portion of said chamber, a second series of spray nozzles connected at intervals along the said second pipe, each of said second nozzles being displaced longitudinally with respect to each of the adjacent first nozzles, each of said spray nozzles in said second series being inclined at substantially the same angle as the spray nozzles in said first series of nozzle to discharge liquid upwardly at an angle to said vertical axis and in substantial alignment with the downward spray adapted to be discharged from the opposite end of said first spray nozzles, a third pipe connecting the interior of said tank with said first and second pipes, pump means for pumping etching liquid from said tank through said third pipe to said first and second pipes and to said nozzles, and means for draining spent etching liquid from said chamber back into said tank.

14. Apparatus as defined in claim 13, and including a third series of spray nozzles mounted at intervals on opposite sides longitudinally along the inner walls of said chamber, said last named nozzles being located at substantially the same level and approximately midway between the upper and lower nozzles of said first and second series of nozzles, the adjacent nozzles of said first, second and third series of nozzles defining a plurality of spray areas through which a work piece is adapted to be conducted, pipes connecting each of the nozzles of said third series of nozzles and communicating with said third pipe, and means for supporting and conducting a work piece longitudinally into said chamber and through said spray areas.

References Cited in the file of this patent

UNITED STATES PATENTS

| | | |
|---|---|---|
| 1,260,395 | Keller | Mar. 26, 1918 |
| 1,850,481 | Telfer | Mar. 22, 1932 |
| 2,187,837 | Paasche | Jan. 23, 1940 |
| 2,508,709 | Goetchius | May 23, 1950 |
| 2,541,901 | Zudemach et al. | Feb. 13, 1951 |